United States Patent [19]
Amadore

[11] Patent Number: 5,203,546
[45] Date of Patent: Apr. 20, 1993

[54] WINDOW SPRING DAMPING APPARATUS

[76] Inventor: Alfred Amadore, 113 Ferraro Dr., Bristol, Conn. 06010

[21] Appl. No.: 564,283

[22] Filed: Aug. 6, 1990

[51] Int. Cl.⁵ .............................................. F16F 1/06
[52] U.S. Cl. .................................. 267/168; 267/166; 267/167; 16/197
[58] Field of Search ........... 16/196, 197, 198, DIG. 6, 16/DIG. 36; 267/166, 168, 169, 73, 74, 180

[56] References Cited

U.S. PATENT DOCUMENTS

| | | | |
|---|---|---|---|
| 190,582 | 5/1877 | Hansell | 267/168 |
| 2,001,835 | 11/1934 | Cook | 267/168 |
| 2,086,321 | 4/1936 | Kudo | 267/180 |
| 2,998,242 | 5/1959 | Schwarzbeck et al. | 267/166 |
| 4,540,070 | 9/1985 | Yonovich et al. | 16/197 |

FOREIGN PATENT DOCUMENTS

| | | | |
|---|---|---|---|
| 857405 | 6/1938 | France | 267/168 |
| 0209636 | 8/1990 | Japan | 267/166 |

Primary Examiner—Robert J. Oberleitner
Assistant Examiner—Chris Schwartz
Attorney, Agent, or Firm—Lorraine Donaldson

[57] ABSTRACT

A window noise attenuation device that keeps window balance springs from ratting against the inside of the spring covers when the balance spring is caused to vibrate. The apparatus is designed to be slipped over the window balance spring during the construction of the window. The device can be installed either by hand or by machine. The apparatus features a positioning section that keeps the device substantially fixed in position on the balance spring during use. An offset section holds the balance spring firmly in position away from the walls of the spring cover and jamb liners when the balance spring is caused to vibrate by rapidly closing or opening the window or from other jarring such as slamming a door. The low cost device is designed to last as long as the window spring mechanism.

7 Claims, 2 Drawing Sheets

WINDOW SPRING DAMPING APPARATUS

BACKGROUND OF THE INVENTION

1. Field of the Invention

The invention relates to sound deadening devices for window mechanisms.

2. Description of the Related Art

Rattling window balance springs are an annoying side effect of using current spring balance mechanisms. While the method of using a spring device to replace sash cords and counterweights is a significant improvement in window construction, a a window that rattles whenever a truck passes, a door slams or when the window is closed or opened rapidly may cause many homeowners to question the quality of such windows. Window manufacturers have been trying for years to develop a cost effective way to eliminate this aberration for years with only limited success.

Various coatings have been tried on the balance springs. U.S. Pat. No. 4,854,558, issued to Newton on Aug. 8, 1989, discloses a hot melt adhesive that is claimed stops rattling when applied to the window spring. This method requires a substantial increase in cost and can also present environmental problems for the factory in installing such coatings.

U.S. Pat. No. 4,540,070, issued to Yonovich on Sep. 10, 1985, discloses a plastic device that is attached to the window balance spring that keeps the spring from rattling against the walls of the spring cover. While this device solves the problems associated with trying to coat the balance spring, the apparatus must be applied by hand which increases the manufacturing costs of the window. As it is made from plastic, the fins that come into contact with the spring cover are subject to repeated flexing and, therefore, subject to fatigue failure from window opening and closing cycles.

A cost effective window spring damping apparatus that can be machine installed during the normal window manufacturing process is not found in the prior art.

SUMMARY OF THE INVENTION

It is an object of the invention to provide an apparatus that will stop window balance springs from rattling against the insides of the spring covers when the window is subjected to vibration from trucks passing, slamming the doors, or rapid open or closing of the window.

It is still another object of the invention to provide an apparatus that is inexpensive to manufacture and can be installed by machine during the window manufacturing process.

It is still a further object of the invention to provide a noise abatement apparatus that will last as long as the window mechanism.

It is still another object of the invention to provide a window spring balance noise attenuating device that is environmentally sound for window manufacturers and window customers.

The invention is an apparatus for attenuating the noise associated with a window balance spring rattling against the insides of its spring cover. The invention is a spring coil capable of being slipped over said window balance spring having a plurality of turns with varying diameters corresponding to the diameter of said spring cover and said balance spring.

DETAILED DESCRIPTION OF THE INVENTION

Figure 1:
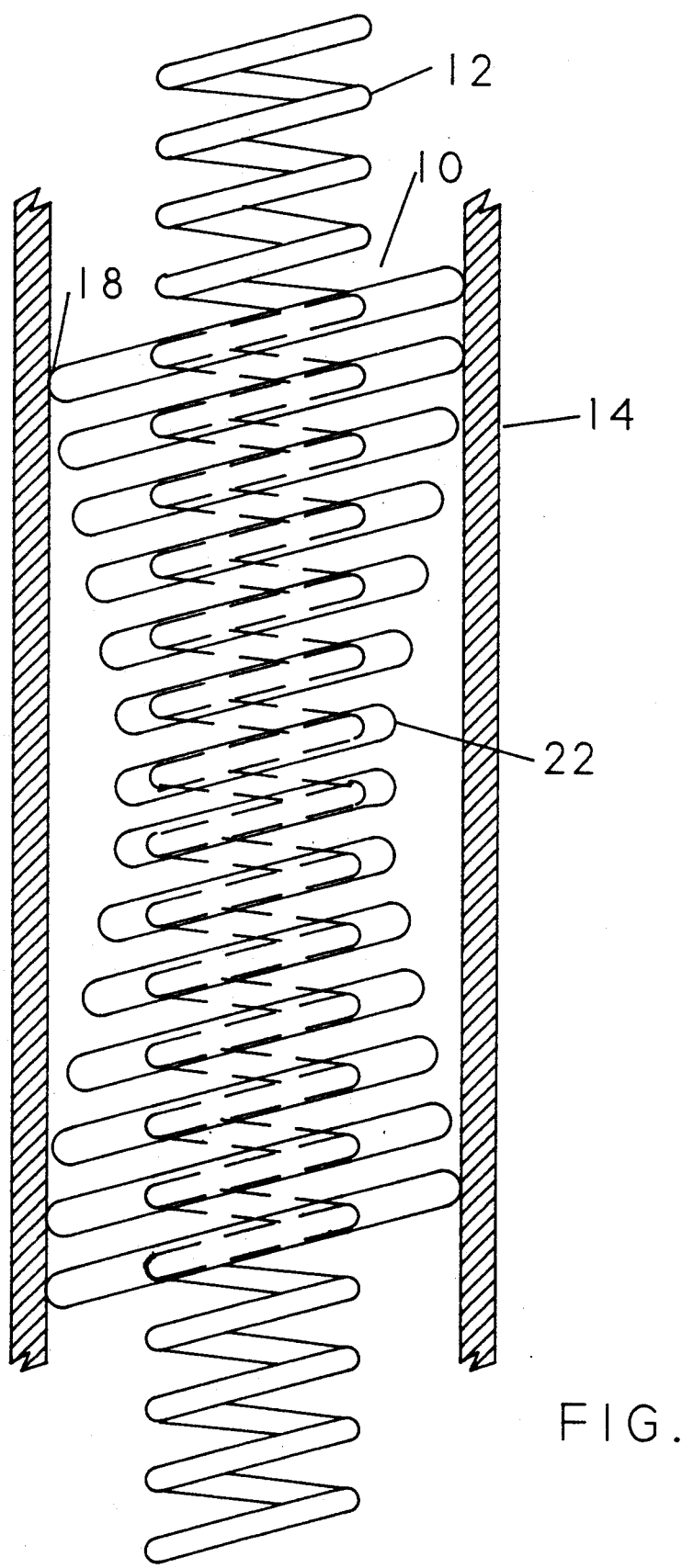
FIG. 1 illustrates a cut-away-view of one embodiment of the invention applied to a window balance spring within a spring cover.

FIG. 1 illustrates a cut-away-view of one embodiment of the invention applied to a window balance spring within a spring cover. Invention 10 is shown in the state of being used having been slipped over window balance spring 12. The specifications of invention 10 will correspond to the dimensions of the window balance spring that is being utilized. For the purpose of illustration, a common balance spring that is approximately 21" long, 23/64" in diameter, and fabricated from galvanized wire having a diameter of 3/64" is assumed.

The length of invention 10 is not critical, however, sufficient numbers of turns must be present to securely position invention 10 on balance spring 12 and have sufficient number of turns to keep balance spring 12 substantially centered within the walls of spring cover 14. For the balance spring described above, the preferred length of the subject invention is approximately 1.5".

An offset section 18 of invention 10 has a number of turns having an outer diameter that corresponds to the diameter of the inside walls of spring cover 14. In the preferred embodiment, offset section 18 should be approximately ½" in diameter. While a single offset section could be used, at least two sections, each approximately ¼" long, are provided thus keeping balance spring 12 firmly positioned away from the walls of spring cover 14.

Invention 10 has a positioning section 22 where the diameter of the coil turns corresponds to the diameter of balance spring 12. Positioning section 22 has a preferred diameter of slightly greater than that of balance spring 12 so that invention 10 can be easily slipped over balance spring 12. While the preferred method of installation is by machine, invention 10 could also be installed by hand as well. In the preferred embodiment, the length of the turns in positioning section 22 is approximately ⅜ inches.

The remaining section of turns in invention 10 is shown as transition section 20 which gradually changes in diameter from positioning section 22 to offset section 18 and makes up the remaining length of invention 10.

Figure 2:
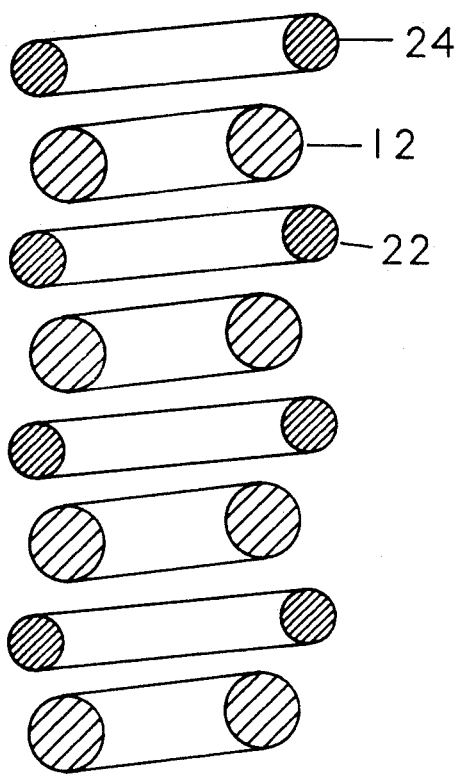
FIG. 2 illustrates a cross-sectional view of the positioning coil section of the invention as applied around a window balance spring.

FIG. 2 illustrates a cross-sectional view of the positioning coil section of the invention as applied around a window balance spring. Balance spring 12 is shown fabricated with wire having a diameter 1/32". The diameter of the wire 24 forming of positioning coils 22 is preferably less than the diameter of the balance spring wire 26, however, the same or even larger diameter wire could be used. When in operation, balance spring 12 is stretched causing the spacing between turns 26 to increase, wherein one or more turns 24 of positioning section 22 will be at least partially detent between the spaces thus keeping invention 10 in substantially the same horizontal position along balance spring 12 despite the lengthening and shortening of spring 12.

Figure 3:
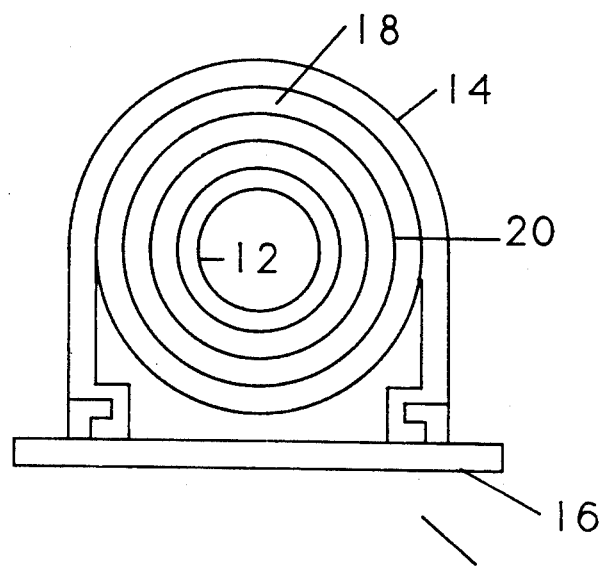
FIG. 3 illustrates a top view of the invention showing the offset coil section holding a window balance spring away from the walls of the spring cover and jamb liner.

FIG. 3 illustrates a top view of the invention showing the offset coil section positioning a window balance spring away from the walls of the spring cover and jamb liner. The diameter of offset section 18 is substantially the same as the diameter of the spring cover 14 with its jamb liner 16 which causes balance spring 12 to be firmly held centered within the track. In this manner, when a vibration causing disturbance occurs, such as a slamming door, balance spring 14 cannot vibrate against spring cover walls 12 or jamb liner 16.

Figure 4:
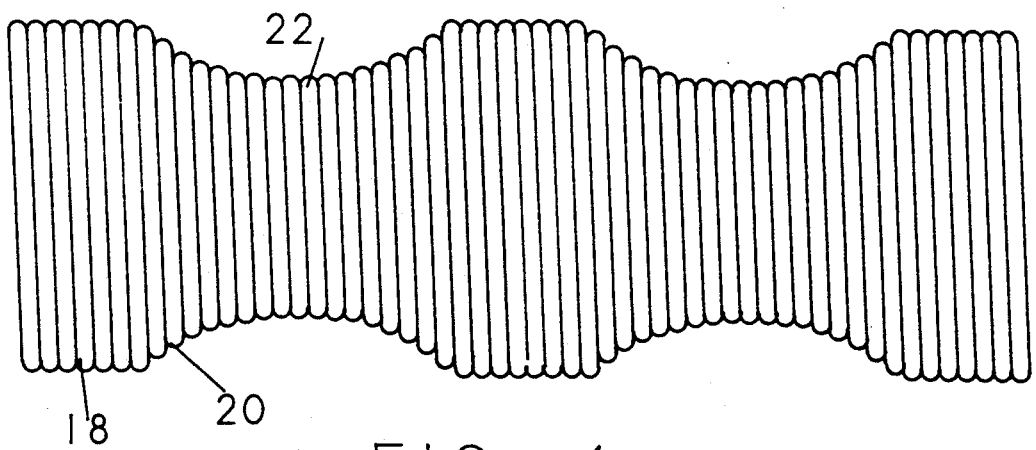
FIG. 4 illustrates a side view of the preferred embodiment of the invention.

FIG. 4 illustrates a side view of the preferred embodiment of the noise abatement apparatus according to the invention. Three offset sections 18 are provided, two at the ends and one substantially in the middle. Each offset section is approximately ¼" in length. The two positioning sections 22 are preferably ⅛" in length.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for attenuating noise associated with a window balance spring rattling within the bore of an associated rigid tubular spring cover comprising:
   a coiled spring member adapted to be slipped over said window balance spring, said member having a plurality of turns varying in diameter between an outer first diameter adapted to engage the inner diameter of said bore of said spring cover and an inner second diameter adapted to engage the outer diameter of said balance spring so as to dampen out any relative oscillations therebetween, said turns of said second diameter forming at least one positioning section in which the turns have a diameter substantially corresponding to the outside diameter of said balance spring such that when said apparatus is slipped over the said balance spring the turns of said positioning section partially detent between the turns of said window balance spring when said window balance spring is stretched thereby keeping said coiled spring member in a relatively fixed position along the length of said window balance spring, said positioning section being located substantially in the middle of said member.

2. The apparatus of claim 1 wherein said turns of said first diameter form at least one offset section having a plurality of turns with diameters substantially equal to the inside diameter of said spring cover thereby holding said balance spring away from the inside walls of said spring cover.

3. The apparatus of claim 2 wherein an offset section is located at each end of the coiled spring member.

4. The apparatus of claim 3 wherein a third offset section is located substantially in the middle of the coiled spring member between the ends of said apparatus.

5. A device for attenuating noise associated with a window balance spring rattling against the inside of an associated rigid spring cover, said device comprising:
   a helical spring of lesser overall length than said balance spring and having a plurality of turns varying in diameter from a first diameter corresponding to the inside diameter of said spring cover and a second diameter wherein said coils will at least partially detent between the coils of said balance spring in an extended condition, said helical spring contacting both said cover and balance spring so as to dampen out any relative oscillations therebetween, said helical spring having at least one of said first diameter coils at least at each end thereof.

6. The device according to claim 5 wherein said helical spring has a continuous longitudinal profile varying between said first and said second diameters.

7. The device according to claim 5 wherein at least one coil of said second diameter is located substantially centrally of said helical spring and said balance spring.

* * * * *